(12) United States Patent
Betawadkar-Norwood et al.

(10) Patent No.: US 10,331,668 B1
(45) Date of Patent: Jun. 25, 2019

(54) APPARATUS AND METHOD FOR QUERY PROCESSING USING ANALYTICAL VIEW PARTITIONS AND DATABASE PARTITIONS

(71) Applicant: Arcadia Data Inc., San Mateo, CA (US)

(72) Inventors: Anjali Betawadkar-Norwood, Campbell, CA (US); Shant Hovsepian, New York, NY (US)

(73) Assignee: Arcadia Data Inc., San Mateo, CA (US)

( * ) Notice: Subject to any disclaimer, the term of this patent is extended or adjusted under 35 U.S.C. 154(b) by 184 days.

(21) Appl. No.: 15/654,357

(22) Filed: Jul. 19, 2017

Related U.S. Application Data

(60) Provisional application No. 62/363,989, filed on Jul. 19, 2016.

(51) Int. Cl.
*G06F 16/2453* (2019.01)
*G06F 16/23* (2019.01)
*G06F 16/245* (2019.01)

(52) U.S. Cl.
CPC ........ *G06F 16/24539* (2019.01); *G06F 16/23* (2019.01); *G06F 16/2358* (2019.01); *G06F 16/245* (2019.01)

(58) Field of Classification Search
CPC .............. G06F 16/23; G06F 16/24539; G06F 16/2358; G06F 16/245
USPC ........................................................ 707/717
See application file for complete search history.

(56) References Cited

U.S. PATENT DOCUMENTS

| | | | | |
|---|---|---|---|---|
| 7,720,841 B2* | 5/2010 | Gu | ...................... | G06F 11/3447 707/721 |
| 10,120,902 B2* | 11/2018 | Erdogan | ............ | G06F 16/24542 |
| 2014/0195558 A1* | 7/2014 | Murthy | ............... | G06F 16/2471 707/770 |
| 2015/0261831 A1* | 9/2015 | Murthy | ............... | G06F 16/2471 707/722 |
| 2018/0074855 A1* | 3/2018 | Kambatla | ............... | G06F 9/505 |

OTHER PUBLICATIONS

Agarwal, Parag, et al., "Asynchronous View Maintenance for VLSD Databases", SIGMOD '09, Providence, RI, Jun. 29-Jul. 2, 2009, pp. 179-192.*

(Continued)

*Primary Examiner* — Robert Stevens
(74) *Attorney, Agent, or Firm* — Cooley LLP

(57) ABSTRACT

A system includes a distributed database with database partitions distributed across worker nodes connected by a network. An analytical view module defines an analytical view comprising dimensions and aggregates defined prior to receipt of a query and maintained as a data unit separate from the distributed database. The analytical view module includes instructions executed by a processor to form analytical view partitions. The query is evaluated to identify implicated fresh analytical view partitions and implicated stale analytical view partitions. The implicated fresh analytical view partitions are accessed to obtain analytical view results. Database results corresponding to the implicated stale analytical view partitions are obtained. A response to the query is supplied based upon the analytical view results and the database results.

4 Claims, 2 Drawing Sheets

(56) References Cited

OTHER PUBLICATIONS

Qu, Hang, et al., "Canary: A Scheduling Architecture for High Performance Cloud Computing", eprint arXiv:1602.01412, Feb. 2016, 13 pages.*
Thusoo, Ashish, et al., "Data Warehousing and Analytics Infrastructure at Facebook", SIGMOD 10, Indianapolis, IN, Jun. 6-10, 2010, pp. 1013-1020.*

* cited by examiner

APPARATUS AND METHOD FOR QUERY PROCESSING USING ANALYTICAL VIEW PARTITIONS AND DATABASE PARTITIONS

CROSS-REFERENCE TO RELATED APPLICATION

This application claims priority to U.S. Provisional Patent Application Ser. No. 62/363,989, filed Jul. 19, 2016, the contents of which are incorporated herein by reference.

FIELD OF THE INVENTION

This invention relates generally to distributed databases. More particularly, this invention relates to query processing using analytical view partitions and database partitions.

BACKGROUND OF THE INVENTION

A distributed database is a database in which storage devices are not all attached to a common processing unit, such as a central processing unit. Instead, multiple computers are used to implement a distributed database management system. The multiple computers may be located in the same physical location, or they may be dispersed over a network of disaggregated interconnected computers. There is typically a master node and a set of slave or worker nodes that store partitions of the distributed database. Each partition may include a set of source files An analytical view is a subset of data from a table or multiple tables. The analytical view may be computed by applying joins, unions, applying filters or other Structured Query Language (SQL) operations to the table or tables. The analytical view typically comprises dimensions and aggregates, although either dimensions or aggregates may be absent. The analytical view may comprise a dimension (e.g., a column name) and an aggregate (e.g., sum, min, max, median, mean) that is defined prior to the receipt of a query and is maintained as a data unit separate from the table. An attribute can be a dimension or an aggregate. When data is grouped along an attribute, it becomes a dimension. When data is aggregated on an attribute, it becomes an aggregate. For example, in the case of the request for 'sum(amt) by product_id', product_id and amt are both attributes in the table. Product_id is used as a dimension and amt is used as an aggregate. The analytical view exposes a dimension 'product_id' and an aggregate sum(amt)'.

Database systems use analytical views to expedite query processing. Analytical views typically materialize (e.g., cache) data resulting from computations frequently needed by queries. When a database system can prove that, semantically, it is correct to answer the query using the data in an analytical view, the system uses the pre-aggregated data from the analytical view to save processor and input/output bandwidth. This results in expedited processing of the query. However, as new data is loaded into the table, the analytical views can become stale and queries serviced from them would be incorrect. Some analytical views can be refreshed incrementally, but not all analytical views are incrementally refreshable. A full re-computation of all analytical views can be an expensive operation so it is desirable to leverage analytical views that are not stale.

In some scenarios, data is loaded into base tables continuously or at a high frequency (e.g., every hour) using an Extract, Transform and Load process. This results in analytical view data getting stale frequently and not being usable to answer queries.

Accordingly, there is a need to establish techniques to process queries utilizing both analytical views and a database content.

SUMMARY OF THE INVENTION

A system includes a distributed database with database partitions distributed across worker nodes connected by a network. An analytical view module defines an analytical view comprising dimensions and aggregates defined prior to receipt of a query and maintained as a data unit separate from the distributed database. The analytical view module includes instructions executed by a processor to form analytical view partitions. The query is evaluated to identify implicated fresh analytical view partitions and implicated stale analytical view partitions. The implicated fresh analytical view partitions are accessed to obtain analytical view results. Database results corresponding to the implicated stale analytical view partitions are obtained. A response to the query is supplied based upon the analytical view results and the database results.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
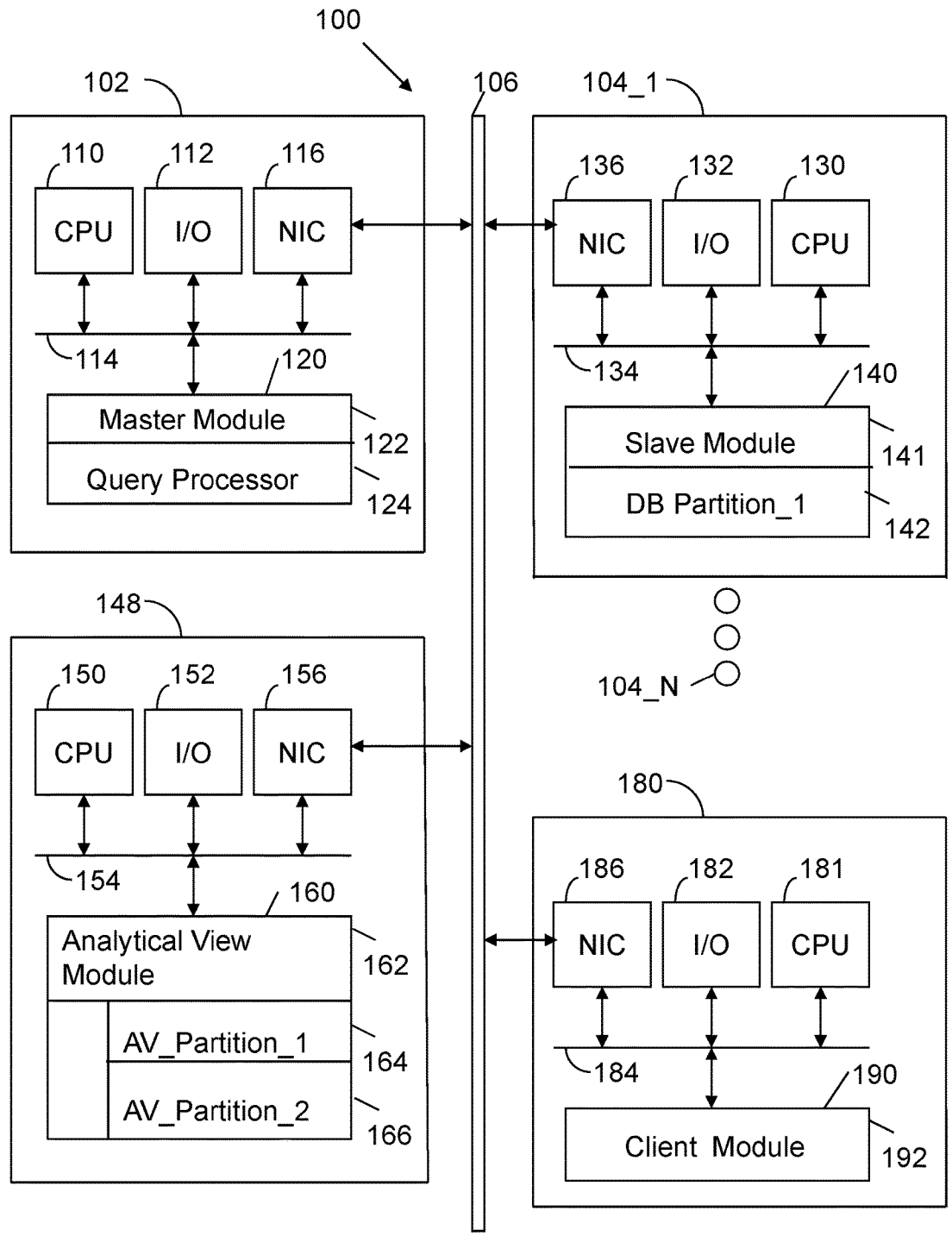
FIG. 1 illustrates a system configured in accordance with an embodiment of the invention.

FIG. 1 illustrates a system 100 configured in accordance with an embodiment of the invention. The system 100 includes a master machine 102 in communication with a set of slave or worker machine 104_1 through 104_N via a network 106, which may be any combination of wired and wireless networks. The master machine 102 includes standard components, such as a central processing unit 110 in communication with a set of input/output devices 112 via a bus 114. The input/output devices 112 may include a keyboard, mouse, touch display and the like. A network interface circuit 116 is also connected to the bus 114 to provide connectivity to network 106. A memory 120 is also connected to the bus 114. The memory 120 includes instructions executed by the central processing unit 110. In particular, the memory 120 stores a master module 122, which includes executable instructions to perform master node operations associated with a distributed database. The memory 120 also stores a query processor 124, which processes queries by applying them across the distributed database implemented across the worker nodes 104_1 through 104_N.

Worker machine 104_1 also includes standard components, such as a central processing unit 130, input/output devices 132, a bus 134, a network interface circuit 136 and a memory 140. The memory 140 stores a slave module 141 to implement slave processing at the direction of the master machine 102. The memory 140 also stores a database partition 142 of a distributed database.

An analytical view machine 148 may also be connected to network 106. The analytical view machine 148 is a query support machine that also includes standard components, such as a central processing unit 150, input/output devices 152, a bus 154, a network interface circuit 156 and a memory 160. The memory 160 stores an analytical view module 162. The analytical view module 162 includes instructions executed by the central processing unit 150 to define an analytical view comprising dimensions and aggregates. The analytical view is maintained as a data unit separate from the distributed database. The analytical view may exist on the same cluster as the underlying base tables. In accordance with an embodiment of the invention, the analytical view module 162 forms analytical view partitions 164, 166, examples of which are provided below. In one embodiment, the query processor 124 of the master module 122 processes a query against base tables by collaborating with the analytical view module 162 to identify fresh and stale partitions of the analytical view and rewrites the query to use fresh partitions of analytical views and the results corresponding to stale partitions of the analytical view are obtained by computing the query against the base tables. That is, the implicated fresh analytical view partitions are accessed to obtain analytical view results. Database results are obtained from database partitions for implicated stale analytical view partitions. The analytical view module 162 may directly access the database partitions or may operate in conjunction with the query processor 124 of the master machine 102 to obtain the database results. A response to the query is formed from the analytical view results and the database results.

FIG. 1 also illustrates a client machine 180 connected to network 106. The client machine 180 includes standard components, such as a central processing unit 181, input/output devices 182, a bus 184, a network interface circuit 186 and a memory 190. The memory 190 stores a client module 192, which allows the client machine to pass queries to the query processor 124 of the master machine 102, which executes the query across the distributed database implemented across worker machines 104_1 through 104_N. Alternately or in addition, the client machine may apply the query to the analytical view machine 148, which may implement a separate query processor. Indeed, the components of analytical view machine 148 may be incorporated into master machine 102 and vice versa.

Figure 2:
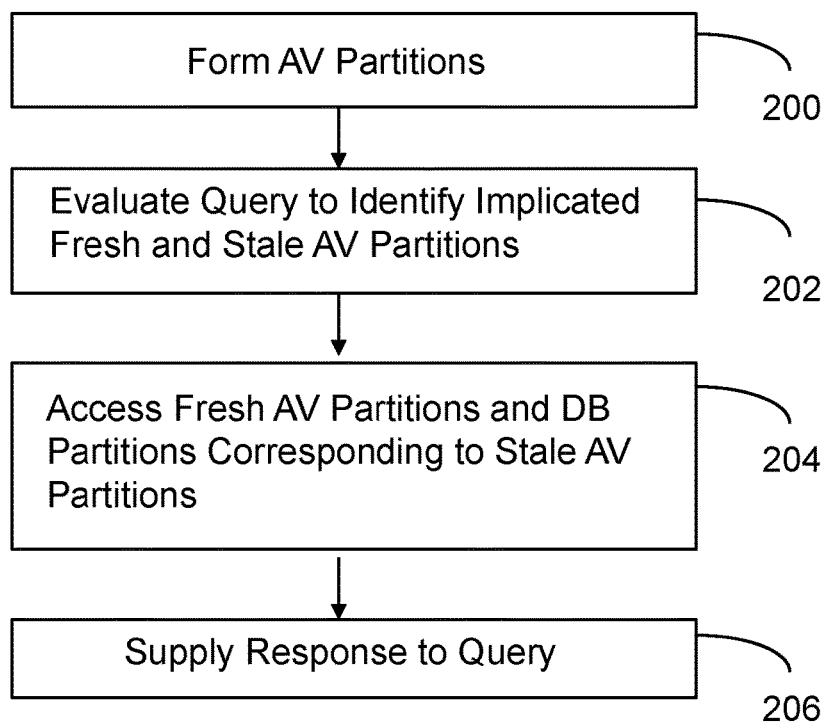
FIG. 2 illustrates processing operations associated with an embodiment of the invention.

FIG. 2 illustrates processing operations associated with an embodiment of the analytical view module 162. Initially, analytical view (AV) partitions are formed 200. Examples are provided below. A query is then evaluated to identify implicated fresh and stale analytical view partitions 202. The fresh analytical view partitions are accessed to obtain analytical view results 204. The rest of the results are obtained from database partitions as database results corresponding to the implicated stale analytical view partitions 204. A response to the query is then supplied 206. More particularly, a response is supplied based upon the analytical view results and the database results.

Consider a table "sales" defined as follows:
   create table sales (order_id integer, cust_name string,
   product_id integer, quantity integer, sales_amt double,
       year
   integer, month integer, day integer)
   partitioned by (year, month, day);
   Given that the sales table is partitioned by year, month and day, a file system based database may store the sales information for the given year, month, day as a file or a set of files in a directory hierarchy. For example, the directory named '2014' may contain subdirectories named '1' through '12' for each month of the year and each of the directories for the month may contain a sub-directory for each day of the month. For example, the path '2014/02/14/sales.txt' shows the sales data for the date Feb. 14, 2014.

Assume that a fairly frequent query encountered by the database system is to show total sales made on a particular day or week or month. In order to improve the performance of such a query, an analytical view may be created as follows:
   create analytical view sales_by_day as
   select year, month, day, sum(sales_amt) as sum_sales
   from sales group by year, month, day partitioned by
   (year, month, day);
   Since the analytical view is partitioned using the columns year, month and day, the aggregated data in the analytical view is also stored similar to the sales table in a directory hierarchy. When the user wants to find out the sales made on a particular day, e.g., Feb. 14, 2014, she issues the query:
   select year, month, day, sum(sales_amt)
   from sales
   where year=2014 and month=2 and day=14 group
   by year, month, day;
   The database system internally routes the query to the analytical view as follows:
   select year, month, day, sum_sales from sales_by_day
   where year=2014 and month=2 and day=14;
   The routing or rewriting of the query to the analytical view is correct only if the analytical view is up-to-date. If the table 'sales' has undergone some changes such as new sales data has been inserted or existing data has been modified, but those changes are not reflected in the analytical view 'sales_by_day' and if the query is answered by using the analytical view, it may result in wrong answers. Most database systems guard against returning incorrect answers by prohibiting the query from getting routed to the analytical view if the analytical view is 'stale' compared to the table it is based on.

Analytical views are a performance aid designed to improve user experience. When a query used to get satisfied from the analytical view and return the answer in a few seconds, now, may take minutes if the analytical view is stale and the query is evaluated against the tables. This breaks the user expectation of query performance and can result in unhappy customers. What is needed is a gradual slow-down in query performance rather than the cliff described above.

The disclosed technique is a novel solution to the problem of sudden degradation in query performance when an analytical view has become stale. The technique uses the analytical view for the partitions that are known to be current and evaluates the query on the table's partitions that have undergone some change (insert, update or delete). The solution uses the underlying property that in many common use cases of analytical views, a partition of the view directly maps to one or more partitions of the underlying table. It is possible to determine which view partition is stale by examining which partition of the table has undergone a change. The invention couples this insight with the query transformation to rewrite the user issued query into two parts: 1) Part of the query that uses results from the current partitions of the analytical view and 2) Part of the query evaluates results by acting on the changed partitions of the underlying table. These two result sets are then combined to yield correct query result.

Imagine the user wishes to know the daily sales. The issued query looks as follows:
   select year, month, day, sum(sales_amt)
   from sales
   group by year, month, day;

The analytical view 'sales_by_day' exists, but it is stale because new data was added into the database for the days Aug. 8, 2014 and Aug. 9, 2014, but the view has not been refreshed after the inserts. The query processor 124 in conjunction with the analytical view module 162 re-writes the query to be:

(select year, month, day, sum(sales_amt)
from sales
where (year=2014 and month=8 and day=8) or
(year=2014 and month=8 and day=9)
group by year, month, day union all
(select year, month, day, sum_sales from
sales_by_day where not ((year=2014 and month=8
and day=8) or (year=2014 and month=8 and day=9));

As the query shows, the results where the data was changed for Aug. 8, 2014 and Aug. 9, 2014 are computed using the sales table, while the rest of the results are computed from analytical view partitions that are still current. This execution strategy may perform slightly slower than if the query could have been completely routed to the analytical view, but it avoids the disastrous drop in performance if the query could not use the analytical view at all.

The code above shows an explicit SQL modeling of the rewritten query. In practice, where the number of records involved is large, such explicit modeling becomes cumbersome (imagine adding predicates for 30-40 days of changed data). A short-hand in the form of a flag is then employed by the optimizer that indicates to the executor to use changed or unchanged partitions of the table. For example, the foregoing query may be represented as:

(select year, month, day, sum(sales_amt)
from sales{changed}
group by year, month, day)
union all
(select year, month, day, sum_sales from
sales_by_day {current})

Imagine that the analytical view is current as of time 'ts1' and the table was modified at time 'ts2' and ts2>ts1. The notation 'sales{changed}' indicates that only those partitions of the sales table that were changed after time ts1 should be used in evaluating the results for the first leg of the 'union all' and 'sales_by_day{current}' indicates only those partitions of the analytical view that were unaffected by the changes to the table after ts1 should be used in evaluating the results for the second leg of the 'union all'.

Now imagine the user wishes to know the promotions that were in effect for each day and the total sales amount. Imagine that a 'promotions' table tracks the information regarding promotions and is defined as follows:

create table promotions (year int, month int, day
int, promo_name string, promo_details);
The query looks as follows:
select agg_sales.year, agg_sales.month,
agg_sales.day, sum_sales, promo_name, promo_details
from (select year, month, day, sum(sales_amt) as
sum_sales from sales group by year, month, day) as
agg_sales, promotions
where agg_sales.year=promotions.year and
agg_sales.month=promotions.month and
agg_sales.day=promotions.day;

Imagine the analytical view is somewhat stale. Using the invention, the query above is rewritten to use current parts of the view:

select agg_sales.year, agg_sales.month,
agg_sales.day, sum_sales, promo_name, promo_details
from (select year, month, day, sum(sales_amt) as
sum_sales from
sales{changed} group by year, month, day
union
select year, month, day, sum_sales from
sales_by_day{current}) as agg_sales,
promotions
where agg_sales.year=promotions.year and
agg_sales.month=promotions.month and
agg_sales.day=promotions.day;

The foregoing example shows how a partially stale analytical view can be used in conjunction with other tables in the query. The following example focuses on a join analytical view that is partially stale. Imagine that the 'purchase' table tracks the purchase price of products. The table definition is as follows:

create table purchase (product_id integer,
product description string, purchase_price double)
partitioned by product_id;
Imagine that a frequent query in the system is to get the profit per day.
select year, month, day, sum(sales_amt−
(quantity*purchase_price)) as profit from sales, purchase where sales.product_id=purchase.product_id
group by year, month, day;
And an analytical view with the following definition is created:
create analytical view daily_profit as
select year, month, day, sum(sales_amt−
(quantity*purchase_price)) as profit
from sales, purchase
where sales.product_id=purchase.product_id group
by year, month, day
partitioned by year, month, day;

Given the analytical view above, when the profit per day query above is issued to the system, the system examines if the analytical view is stale. It is possible that the analytical view is stale for one of the two reasons. First, the table 'purchase' was modified: in this case, the query cannot be routed to the analytical view, since every partition of table 'sales' has to be joined with the entire 'purchase' table. The 'purchase' table here is a look-up or a dimension table. The dimension tables tend to change slowly over time or not change at all. Second, the table 'sales' was modified: in this case, the query is rewritten to use the current partitions of the analytical view and the changed parts of the 'sales' table. The rewritten query looks as follows:

(select year, month, day, sum(sales_amt−
(quantity*purchase_price)) as profit
from sales{changed}, purchase where
sales.product_id=purchase.product_id group by
year, month, day)union all
(select year, month, day, profit from
daily_profit{current});

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system, comprising;
    a distributed database with a plurality of database partitions distributed across a corresponding plurality of worker nodes connected by a network; and
    an analytical view module to define an analytical view comprising dimensions and aggregates defined prior to the receipt of a query and maintained as a data unit separate from the distributed database, wherein the analytical view module includes instructions executed by a processor to:
        form analytical view partitions,
        evaluate the query to identify implicated fresh analytical view partitions and implicated stale analytical view partitions,
        access the implicated fresh analytical view partitions to obtain analytical view results,
        obtain from database partitions database results corresponding to the implicated stale analytical view partitions, and
        supply a response to the query using the analytical view results and the database results.

2. The system of claim 1 further comprising a client machine connected to the network to secure the response to the query.

3. The system of claim 1 wherein the analytical view module is executed by an analytical view machine connected to the network.

4. The system of claim 1 wherein the analytical view module is executed by a master machine connected to the network, wherein the master machine coordinates the operation of the plurality of worker nodes.

* * * * *